United States Patent [19]

McCarthy

[11] 4,385,996
[45] May 31, 1983

[54] CONTROL OF TRIHALOMETHANES IN WATER TREATMENT

[75] Inventor: Timothy W. McCarthy, Walnut Creek, Calif.

[73] Assignee: Allied Corporation, Morris Township, Morris County, N.J.

[21] Appl. No.: 317,802

[22] Filed: Nov. 3, 1981

[51] Int. Cl.$^3$ ............................................. C02F 1/58
[52] U.S. Cl. ..................... 210/719; 210/753; 210/757; 210/764; 210/908
[58] Field of Search ............... 210/702, 714, 721, 723, 210/726, 754, 757, 758, 908, 764, 755, 756

[56] References Cited

U.S. PATENT DOCUMENTS

| | | | |
|---|---|---|---|
| 3,909,408 | 9/1975 | Ishida et al. | 210/757 |
| 3,953,330 | 4/1976 | Tonkyn et al. | 210/728 |
| 3,994,806 | 11/1976 | Rausch et al. | 210/728 |
| 4,243,525 | 1/1981 | Greenberg | 210/754 |
| 4,282,104 | 8/1981 | Pacini | 210/764 X |
| 4,340,489 | 7/1982 | Adams et al. | 210/758 X |

OTHER PUBLICATIONS

A. L. Lange et al., J. AWWA Nov. 1978, pp. 653-660.
R. A. Baker, J. AWWA, Dec. 1964, pp. 1578-1592.
J. S. Schreiber, J. AWWA, Mar. 1981, pp. 154-159.
H. Hayatsu CA 93: 209358n (1980).
M. D. Umphres, et al., Water/Eng. & Mgt. (1981), pp. R65-R74.
J. J. Rook, Env. Sci. Tech. 11 (1977), pp. 478-482.
V. L. Snoeyink, et al., Chap 16, Disinfection-Water and Waste-Water, pp. 339-358, Ann Arbor Publ. Co. (1975).
U. Lahl, et al., Water Research vol. 15 (1981) pp. 803-814.
T. Baba, et al., CA 84:111339w (1976).
R. Otson, et al., Env. Sci. Tech. 15 (1981), pp. 1075-1080.
I. M. Rice et al., Water/Eng. & Mgt. (1981), pp. 59-66.
J. Drahonovsky, CA 89:64730h (1978).

*Primary Examiner*—Thomas G. Wyse
*Attorney, Agent, or Firm*—Arthur J. Plantamura; Jay P. Friedenson

[57] ABSTRACT

Trihalomethanes (THM's) in water, particularly in drinking water, are substantially reduced by treatment of the water with small amounts, i.e., below about 50 ppm, of sulfite ion supplied by sodium metabisulfite or sulfur dioxide. The addition to the water of the sodium metabisulfite alters the structure of the THM's precursor and lowering the chlorine demand. The sulfite ion may be introduced prior to chlorination, or at an intermediate stage of the chlorination, or in adjunct with the chlorination which permits the use of substantially reduced amounts of chlorination.

9 Claims, 3 Drawing Figures

TOTAL TRIHALOMETHANE vs CHLORINE
(INSTANTANEOUS OBSERVATION)

TOTAL TRIHALOMETHANE vs CHLORINE
(SEVEN DAY OBSERVATION)

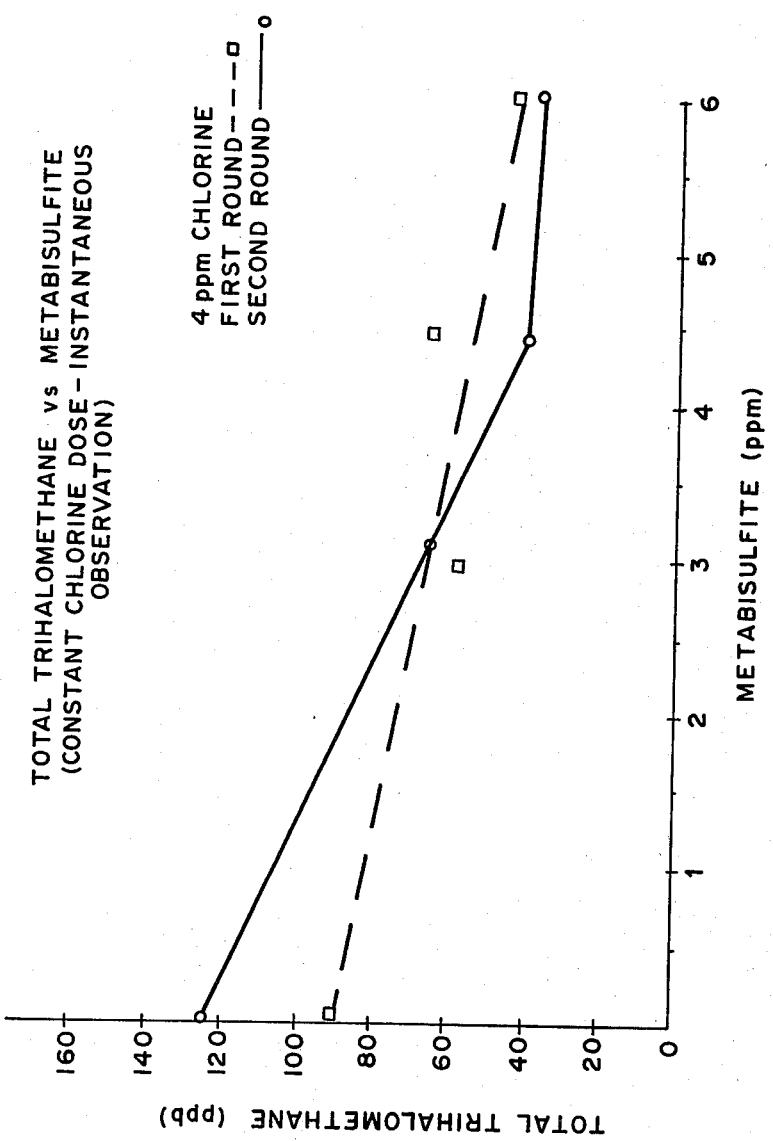

CONTROL OF TRIHALOMETHANES IN WATER TREATMENT

TECHNICAL FIELD

The present invention relates to the chemical treatment of water, particularly potable water to effect a reduction in the formation of total trihalomethanes (TTHM's) in the water by introducing into the water a small but effective amount of sulfite ion from a compound selected from the group consisting of sodium metabisulfite and sulfur dioxide. Specifically, the treated water is processed so as to be in compliance with, and preferably well below, the Environmental Protection Agency's proposed maximum tolerable contamination level of TTHM's of one hundred parts per billion.

BACKGROUND OF THE INVENTION

Considerable publicity has been generated concerning the use, and harm therefrom, of chlorine in drinking water plants resulting in the formation of the chlorinated hydrocarbons known as total trihalomethane. These are now labeled as carcinogenic by the EPA, which is expected to issue regulations which limit the TTHM at 100 ppb. Among the carcinogens formed are chloroform, carbon tetrachloride and trihalomethanes.

Many municipal drinking water plants are, or have been, involved in extensive bench tests and plant trials for methods to reduce the TTHM in their plant water. The EPA and the American Water Works Association (AWWA) have expended considerable resources on consulting fees and funding projects to this end. The alternative methods have been poor at best, and purport to introduce very costly chemicals, or equipment for THM reduction.

Some prior efforts to reduce total trihalomethane as summarized as follows:

| Means Attempted | Remarks |
|---|---|
| 1. Substituting chlorine with chlorine dioxide | (a) Very expensive equipment; over $1.0MM for a medium size plant |
| Tests have shown that in some waters ClO$_2$ is not always effective. It has demonstrated an ability to reduce the halogens, but at times, has no effect on the THM. | (b) Chlorine & sodium chlorite are expensive chemicals. |
| | (c) ClO$_2$ is 15 to 20 × cost of Cl$_2$. |
| | (d) Forms a toxic products of chlorite & chlorate in H$_2$O. |
| | (e) ClO$_2$ is a very unstable explosive gas for a water treatment plant to store and handle. High energy (electrical) costs to operate in ore site chlorine dioxide generator. |
| 2. Use of Powdered Activitated Carbon (PAC) | (a) Very expensive equipment; over $1.5MM for a medium size plant. |
| PAC carbon columns require a furnace for regeneration. It is an added capital expenditure, and the energy costs (oil, or natural gas) are astronomical. | (b) Little effect after chlorinated carbons form. |
| | (c) Will not meet EPA's Maximum Trihalomethane Potential Limit, i.e., MPT = after 30 hrs. retention, THM will increase. |
| | (e) Unrealistic high dosages makes it an unlikely candidate. |
| 3. Adding Ammonia with Chlorine | (a) Generally undesirable and needs special feeding equipment. |
| To form a more stable disinfectant in the production of chloramines. Turbidity & pH of water is very sensitive to success. | (b) A tight chlorine to ammonia ratio (1 to 3) must be maintained in system. |
| | (c) Treatment error will cause taste and odor problems. |
| | (d) Not especially effective against the THM, chloroform. |
| | (e) A pH below 6.0 must be maintained until after post chlorination. Causes "etching" on the cement walls of the sedimentation basins on the cement walls. |
| 4. Overdosing Treatment with Alum | (a) Reduced TOC by 60% but precurses not removed. |
| Dosage rates, over those required for color & turbidity removal, were employed in the absence of prechlorination. Post chlorination dosages were high. | (b) Significant treatment cost increases dramatically. |
| | (c) High demand on caustic soda for pH elevation. |
| | (d) Creation of abnormally high sludge production. |
| | (e) Low pH would etch cement sedimentation basins. |

Other tests, includings, boiling, ozone, ultra violet light, iodine, surfactants, polymers, gamma radiation and others have also been considered but because of cost, ineffectiveness or toxicity, such tests were abandoned.

It is thus apparent that a need exists for a practical and dependable means to effect the reduction of trihalomethanes in drinking water.

BRIEF SUMMARY OF THE INVENTION

This invention relates to a chemical process of controlling or reducing the formation of the total trihalomethanes in the drinking water treatment by applying a small but effective amount of a sulfite ion supplying compound selected from sodium metabisulfite or sulfur dioxide to reduce the maximum contaminant level (MCL) of total trihalomethanes (TTHM) that would be present in the water.

More particularly, the invention relates to a chemical process of reducing the chlorine demand required for drinking water as a disinfectant with the addition, during the purification treatment of the water, of a small quantity of sodium metabisulfite or sulfur dioxide, preferably sodium metabisulfite. The sulfite ion is introduced preferably prior to prechlorination, or intermediate chlorination stages and may be employed with diminished amounts of prechlorination.

In a broader aspect the invention relates to the control of the precursor or to the inhibition of an environment, in the water being treated so that it is nonconducive to the formation of trihalomethanes THM by the use of sulfite ion; this frequently results in lower chlorine demand because of the alteration in the structure of these precursors present in the water. Thus, the treatment of source waters to reduce levels of total trihalomethane (TTHM) precursors prior to chlorination is an attractive alternative to costly post-treatments such as stripping or activated carbon.

DETAILED DESCRIPTION OF THE INVENTION

Figure 1:
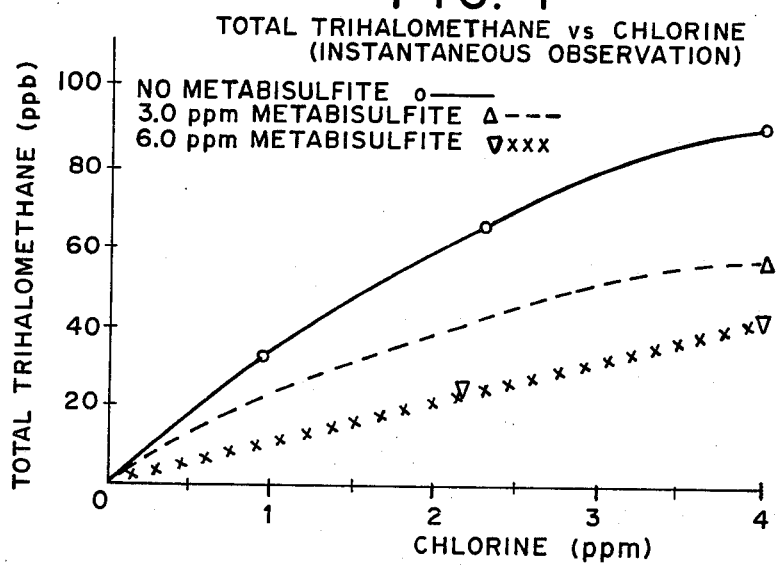

The use of sodium bisulfite in accordance with the decontamination and purification of water affords an economical, commercially feasible, and convenient method of adding small amounts of sulfite ion which results in the reduced potential formation of total trihalomethanes (TTHM).

The introduction of the sulfite ion into the drinking water purification process can be effected without any interference, or deleterious effect, to the treatment process, which might include the feeding of inorganic chemicals (alum, aluminum chloride, or ferric chloride), or the (organic) coagulant polymers. In some treated waters, where these treatment levels are related to the organics in the water, the use of sodium bisulfite affords substantial economies because of the small dosages required.

Additionally, a liquid solution of sodium metabisulfite can be homogeneously mixed with liquid alum and other liquid inorganic ($AlCl_3$, $FeCl_3$) salts for a commercially feasible combination formula, which can be fed at a drinking water plant for a single point application. The mixing and transporting of these blended formulas, may be effected at the point of manufacture by simply adding them together at the time of loading, prior to shipment. Ratios of mixing sulfite ion and alum, for example, can be so formulated so as to provide custom blends for individual drinking water plants. Such ratios are adjusted so as to minimize color, taste and odor in drinking water in processing plants, when metabisulfite is used for this purpose, or as a resultant effect, when the sulfite is used for the control of THM.

The use of the sulfite ion supplying compound in the treatment of potable water in accordance with the invention is not intended to replace chlorine as a disinfectant and purification aid. Rather the use of the sulfite ion is employed so that a reduction in the chlorine feed, for example, to an amount wherein the EPA's MCP limit can be met. In accordance with the invention, relatively small dosages of the metabisulfite will produce substantial reductions in the potential formation of TTHM and a reduced chlorine demand.

In summary the advantages of the invention involving the addition of sulfite ion include at least the following:

1. A significant reduction in TTHM which results from the pretreatment of the waters with the sulfite ion prior to chlorination.
2. The successful maintenance of chlorine residual for at least seven days after treatment when sulfite ion is added.
3. Improved control of bacterial growth by use of sulfite ion in conjunction with chlorination.
4. Non-interference of the sulfite ion with pH or total organic carbon control. Durability of the treatment of waters with the sulfite ion.
5. The magnitude of the 7-day TTHM formation potential is not related to the concentration of metabisulfite applied. For example, sodium metabisulfite treated water did not catch up to the untreated control counterparts in the formation of TTHM over seven days.
6. All three of the variables; time, chlorine dose, and sulfite ion concentration, independently influenced TTHM formation. The sulfite, as well as the chlorine, shows significant interaction effects on TTHM formation.

The examples which follow illustrate the essence of the effect of use of sodium metabisulfite in reducing the formation of total trihalomethanes in water. It is to be understood that these examples are not to be interpreted as limiting the scope of the invention. Rather it is intended that the scope of the invention be defined by the claims appended hereto. The examples, and the resulting data, presented hereinbelow were made with sodium metabisulfite as the source of sulfite ion. However, the advantages of the invention are substantially attainable also by employing sulfur dioxide.

EXAMPLES

Solid sodium metabisulfite was added at concentrations of 0, 3.0 and 6.0 ppm. Stirring at 40 rpm was commenced for 45 minutes. This contact period was intended to simulate the lapsed time for this particular plant between the application of polyelectrolyte and metabisulfite which will actually exist during full scale plant testing.

Following the initial 45 minute contact period, the stirrers were briefly halted to permit the addition of alum at 22 ppm and chlorine at the appropriate level which is one the normal water treatment process. Mixing was resumed for 30 minutes after which time the samples were allowed to settle for 3 hours which simulates plant settling. The settled waters were filtered through GF/C glass fiber mats using a millipore vacuum filtration apparatus. Upon completion of filtration, chlorine residuals were measured and adjusted to 0.7 ppm. Downward adjustment was accomplished by adding the theoretical required amount of metabisulfite to adjust for any excess chlorine added and upward by adding chlorine.

The pH was measured and recorded following the adjustment of the chlorine residuals. The pH of each solution was then adjusted to 8.4 using 0.1 N NaOH. Samples were withdrawn for instantaneous TTHM analysis and transfered to vials containing a few milligrams of sodium thiosulfate as a part of the analytical procedure to remove any residual chlorine.

Another 40 mL sample was collected for total organic carbon (TOC) analysis, and a 40 mL sample for standard plate count was placed in a pre-sterilized plastic bottle. An additional set of samples was collected from water treatment plant for comparison purposes at the conclusion of the experiments.

Figure 2:
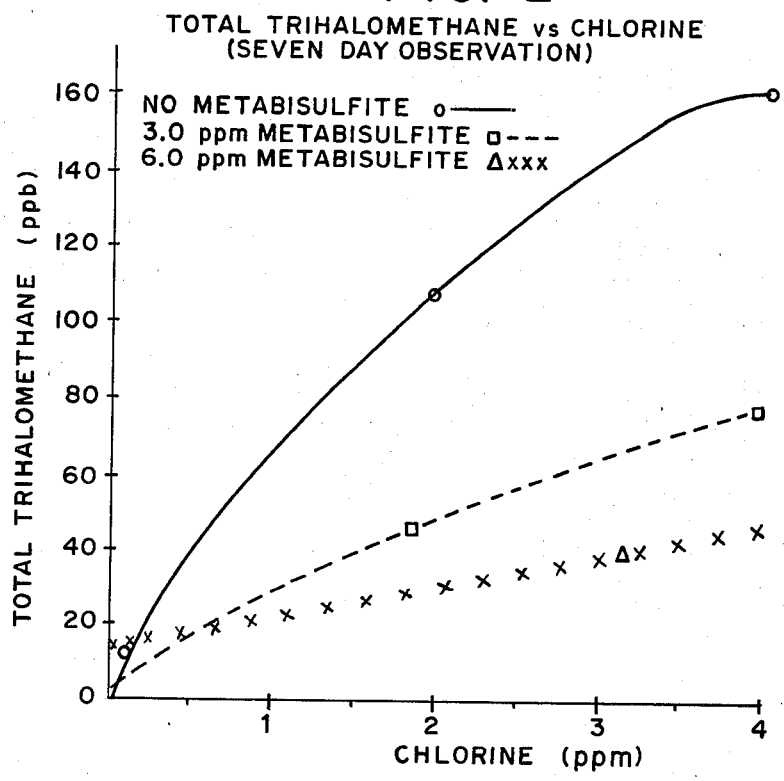

The effect of utilizing the metabisulfite is shown in FIG. 1, which illustrates the instantaneous total trihalomethanes (TTHM) vs. chlorine dose and in FIG. 2, which illustrates the seven-day total trihalomethanes vs. metabisulfite dose. It is seen that samples treated with 6.0 ppm metabisulfite exhibit a linear relationship with TTHM levels and chlorine dose in every case. In general, higher TTHM levels develop at higher applied chlorine levels.

The effect of total trihalomethane vs. metabisulfite is indicated by reference to FIG. 3 in which the inverse relationship at the 4 ppm chlorine level for the instantaneous TTHM is illustrated. In the first round instantaneous TTHM levels dropped from 89 ppb to 42 ppb, while a drop from 126 ppb to 38 ppb was obtained during the second round.

It will be realized that various changes may be made to the specific embodiments shown and described in operating conditions detailed without departing from the essential concept and spirit of the present invention.

I claim:

1. A method of treating water to disinfect the water and reduce the formation of trihalomethanes which comprises adding to the water from about 0.1 to about 50 parts per million of sulfite ion supplied by a compound selected from the group consisting of sodium metabisulfite and sulfur dioxide to reduce the chlorine demand and thereafter adding to the water sufficient chlorine to react with any biological materials present and maintain a residual amount of chlorine sufficient to disinfect the water and make the water potable, whereby the formation of trihalomethanes present in the water amounts to less than 100 parts per billion.

2. The method of claim 1 wherein the sulfite ion is supplied by sodium metabisulfite.

3. The method of claim 1 wherein the sulfite ion is supplied by sulfur dioxide.

4. The method of claim 1 wherein the chlorine is added from about 0.5 to about 24 hours after addition of the sulfite ion supplying compound.

5. The method of claim 1 wherein the amount of sulfite ion supplying compound added to the water is from about 0.5 to about 20 parts per million.

6. The method of claim 1 wherein the formation of trihalomethanes present in the water amounts to less than 80 parts per billion.

7. The method of claim 1 wherein the treated water is first coagulated and said sulfite ion is added subsequent to the coagulation step.

8. The method of claim 1 wherein at least part of the sulfite ion supplying compound is added simultaneously with prechlorination.

9. The method of claim 1 wherein at least part of the sulfite ion supplying compound is added intermediate of the chlorination treatment of the water and an additional amount of the sulfite ion supplying compound is added post-chlorination.

* * * * *